Patented Sept. 10, 1946

2,407,560

UNITED STATES PATENT OFFICE 2,407,560

MANUFACTURE OF THE OPTICALLY ACTIVE FORMS OF PANTOTHENIC ACID

Richard Kuhn and Theodor Wieland, Heidelberg, Germany, assignors to Winthrop Chemical Company, Inc., New York, N. Y., a corporation of New York No Drawing. Application August 26, 1941, Serial No. 408,355. In Germany August 10, 1940

3 Claims. (Cl. 260—284)

This invention relates to the manufacture of the optically active forms of pantothenic acid.

Pantothenic acid, a vitamin of the B-vitamin-group, is the acid amide compound of $\alpha,\gamma$-dihydroxy-$\beta,\beta$-dimethylbutyric acid and $\beta$-alanine. It contains an asymmetrical carbon atom.

If d,l-$\alpha,\gamma$-dihydroxy-$\beta,\beta$-dimethylbutyric acid-lactone is used in the synthesis of pantothenic acid as the starting material, the racemic d,l-pantothenic acid is obtained, the usual salts and derivatives of which are obtained in a non-crystalline state. It has now been found that this racemate can easily be split up into the optic antipodes by preparing the readily crystallizing quinine salt or cinchonidine salt of the d,l-pantothenic acid and by subjecting the partial racemates to fractional crystallization. In the case of the quinine salt the compound being more difficultly soluble is the salt of the (—)-pantothenic acid from which the free acid may easily be separated in pure form. From the quinine salt being more readily soluble the (+)-pantothenic acid is obtained by removing the quinine. In the case of the cinchonidine salts the salt of the dextrorotatory biologically active pantothenic acid is more difficultly soluble. The cinchonidine salt, therefore, is especially suited for the manufacture of the biologically active (+)-pantothenic acid. For the manufacture of the pure d-pantothenic acid it is sufficient to recrystallize once the mixture of both cinchonidine salts. The brucine salt of the natural pantothenic acid has already been prepared. But it is amorphous like all other known salts and derivatives of the pantothenic acid. It was, therefore, surprising, that the quinine salt and the cinchonidine salt, which represent the first crystallized derivatives of the pantothenic acid, crystallize so well, that a separation of the antipodes is possible. Because of the good crystallizability of the salts it is not necessary to use pure d,l-pantothenic acid as the starting material; from solutions of the impure reaction product as they are obtained during the synthesis, the quinine and cinchonidine salts may also be obtained.

For the manufacture of the quinine and cinchonidine salts e. g. the free acid may be treated with the calculated quantity of the alkaloid, or salts of the d,l-pantothenic acid may be reacted with salts of quinine or cinchonidine, or esters of pantothenic acid may be saponified with quinine or cinchonidine. From the salts the optically active acids may be set free according to the methods usual for this purpose.

The invention is illustrated by the following examples the parts being by weight, but it is not restricted thereto:

Example 1

2 parts of d,l-pantothenic acid are dissolved in a small quantity of water and brought to a pH of 8.5 with baryta water. A hot aqueous solution of neutral quinine sulfate is carefully added to this solution, until all the barium has just precipitated. The precipitate is then centrifuged off. The aqueous solution is concentrated under diminished pressure. After some time the syrup obtained begins to crystallize and upon grinding with acetone changes to a white powder of fine crystals. This powder is recrystallized several times from acetone-methanol (1 to 1) whereupon the quinine salt of the (—)-pantothenic acid precipitates in form of colorless soft shining needles melting at 165 to 167° C. (Berl's method).

1 part of this quinine salt is dissolved in 10 parts of water and rendered alkaline to phenolphthalein with baryta water. The quinine precipitated is removed by shaking out three times with chloroform and three times with ether. The barium is removed from the aqueous solution by adding sulfuric acid in the exactly required quantity. After centrifuging off the barium sulfate, the aqueous solution is evaporated under diminished pressure. Thereupon the free (—)-pantothenic acid remains as a syrup-like substance being readily soluble in water and alcohols. The specific rotation is $(\alpha)_D^{21} = -26.7°$ in water and $(\alpha)_D^{24} = -56.3°$ in methanol.

The barium salt of the (—)-pantothenic acid which is obtained by neutralizing the aqueous solution with baryta water and concentrating in a desiccator, is a bitter tasting glass-like substance being readily soluble in water and alcohol. The specific rotation is $(\alpha)_D^{24} = -20.4°$ in water, the rotation of the pantothenate-ion is calculated therefrom to $(\alpha)_D^{24} = -26.8°$.

The (+)-pantothenic acid is obtained as follows:

The syrup remaining after the above-stated reaction of 2 parts of d,l-pantothenic acid with quinine sulfate and after evaporating the water under diminished pressure is ground with 80 parts of hot acetone. After filtering off the quinine salt of the (—)-acid from the mixture while still hot, the acetone solution is kept for some time in the ice box. The quinine salt of the (—)-acid which has precipitated is then filtered with suction and the mother liquor is evaporated under diminished pressure. The residue is recrystallized four times from acetone or methylethylketone while the more difficultly soluble parts are removed by filtering with suction the still warm solution. A quinine salt melting at 138 to 142° C. is obtained in form of white needles: $(\alpha)_D^{22} = -98°$.

Efficiency (in relation to (+)-pantothenic acid) = 50,000,000 sbm. units (streptobacterium units) per gram.

Yield 1 part of quinine salt.

By decomposing the said quinine salt with aqueous barium hydroxide solution as stated for the (−)-acid the barium salt of the (+)-pantothenic acid is obtained: $(\alpha)_D^{22} = +19.2°$.

Efficiency (pantothenate-ion) = 50,000,000 sbm. units per gram.

If esters of the d,l-pantothenic acid are treated with the calculated quantity of quinine in aqueous alcoholic solution, likewise the quinine salts of the antipodes are obtained after evaporation of the solvent. They may be separated as indicated above.

Example 2

A solution of 2 parts of barium-d,l-pantothenic acid in 12 parts of methanol are mixed while warm with a solution of cinchonidine sulfate in methanol as long as barium sulfate precipitates. The mixture is centrifuged and the precipitate is washed twice with warm methanol. The methanol solutions united are concentrated to a thin syrup under diminished pressure whereupon the whole mass crystallizes after standing for some hours. The mixture of the two cinchonidine salts is dissolved in the just necessary quantity of boiling methylethylketone. While cooling the cinchonidine salt of the (+)-pantothenic acid precipitates in form of fine white needles melting at 178 to 179° C. (Berl's method). Yield 1.2 parts. Further recrystallization does not change the melting point: $(\alpha)_D^{18} = -62.3°$ (water).

The biological efficiency in the growing test according to Möller amounts to 50,000,000 sbm. units per gram for the (+)-pantothenic acid contained in the cinchonidine salt. The efficiency is just twice as great as that of the racemate.

We claim:

1. In a process for the optical resolution of a racemic pantothenic acid compound, the step which comprises separating by fractional crystallization from a solvent comprising essentially a lower aliphatic ketone the diastereomeric crystalline pantothenic acid salts of an alkaloid of the group consisting of quinine and cinchonidine.

2. The process for obtaining an alkaline metal (+) pantothenate which comprises forming the crystalline cinchonidine salts of the (+) and of the (−) pantothenic acid by reacting a d,l-pantothenic acid compound with cinchonidine, separating the diastereomeric crystalline cinchonidine pantothenates so obtained by fractional crystallization from a solvent comprising essentially a lower aliphatic ketone, and converting the cinchonidine (+) pantothenate thereby obtained as the less soluble diastereomer into an alkaline earth metal (+) pantothenate by double decomposition with a water-soluble alkaline metal earth base.

3. The process for obtaining an alkaline earth metal (+) pantothenate which comprises forming the crystalline cinchonidine salts of the (+) and of the (−) pantothenic acid by reacting an alkaline earth metal d,l-pantothenate with cinchonidine sulfate, removing the insoluble alkaline earth metal sulfate, separating the diastereomeric crystalline cinchonidine pantothenates so obtained by fractional crystallization from a solvent comprising essentially a lower aliphatic ketone, and converting the cinchonidine (+) pantothenate thereby obtained as the less soluble diastereomer into an alkaline earth metal (+) pantothenate by double decomposition with a water-soluble alkaline earth metal base.

RICHARD KUHN.
THEODOR WIELAND.